E. R. WHITNEY.
BEARING AND BEARING BOX.
APPLICATION FILED NOV. 4, 1904.

982,165.

Patented Jan. 17, 1911.

WITNESSES:
George A. Thornton
Helen Oxford

INVENTOR:
Eddy R. Whitney,
By Albert G. Davis
Att'y.

UNITED STATES PATENT OFFICE.

EDDY R. WHITNEY, OF LYNN, MASSACHUSETTS, ASSIGNOR TO GENERAL ELECTRIC COMPANY, A CORPORATION OF NEW YORK.

BEARING AND BEARING-BOX.

982,165.  Specification of Letters Patent.  Patented Jan. 17, 1911.

Application filed November 4, 1904. Serial No. 231,364.

*To all whom it may concern:*

Be it known that I, EDDY R. WHITNEY, a citizen of the United States, residing at Lynn, county of Essex, State of Massachusetts, have invented certain new and useful Improvements in Bearings and Bearing-Boxes, of which the following is a specification.

My present invention relates to journal bearings and the boxes in which they are supported and consists in certain novel and useful features of construction and arrangement whereby a highly reliable and efficient bearing and box therefor is obtained.

The various features of novelty of my present invention are pointed out with particularity in the claims annexed to and forming a part of this specification. For a better understanding of my invention, however, reference may be had to the accompanying description and drawings in which I have described and illustrated one form in which my invention may be embodied.

Figure 1:
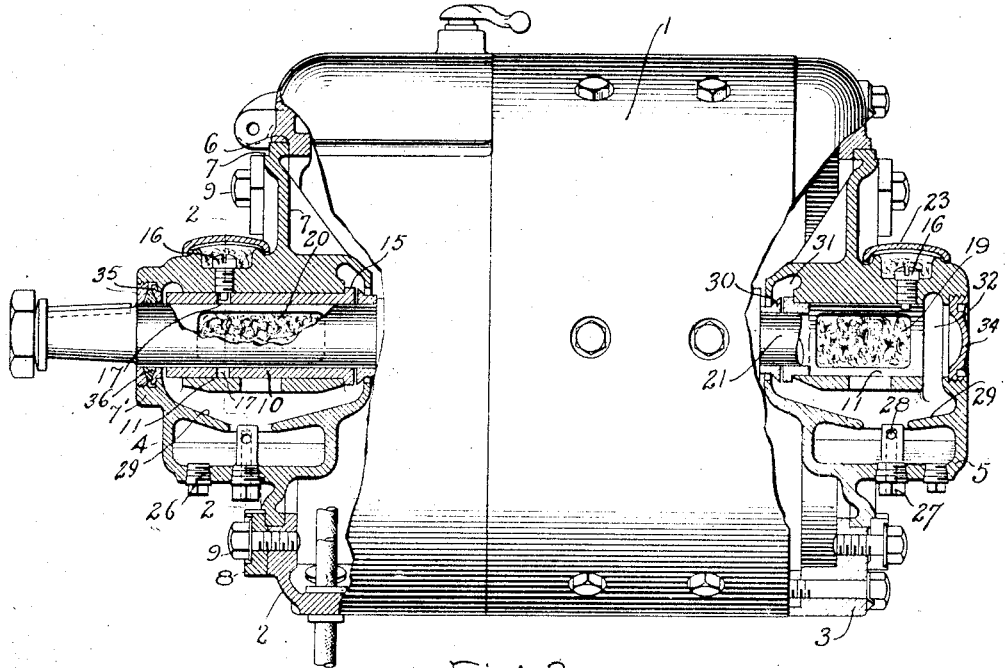
Figure 2:
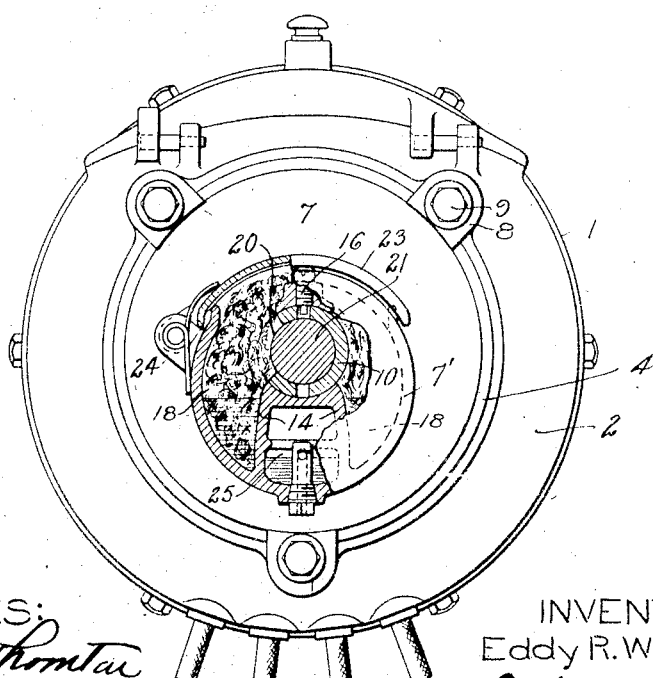

Of the drawings, Figure 1 is an elevation with parts broken away and in section showing an electric motor equipped with my invention; and Fig. 2 is an end elevation of the motor shown in Fig. 1 with parts broken away and in section on the line 2—2 of Fig. 1.

Referring to the drawings, 1 represents the field ring of an automobile motor having end members or heads 2 and 3 secured to its ends. Each of the end members is formed with a large centrally located aperture in which the bearing box members 4 and 5, respectively, are secured as shown. Each of the end members is rabbeted at 6 to form a supporting surface against which a circular flange 7 integrally formed on the corresponding bearing box member may find a seat. The bearing box members are secured in place by clamping members 8 and clamping bolts 9 tapped into the end members. With this construction the bearing boxes are angularly adjustable in the heads in which they are supported.

The bearing box members 4 and 5 are substantially identical in construction though in the construction shown in Fig. 1 the right hand bearing is slightly smaller than the left. Each bearing box member comprises a substantially cylindrical chambered portion 7' which forms the bearing box proper. The flanges 7 extend from the periphery of the portions 7'. The bearing box members are preferably formed out of cast metal, cast iron being ordinarily employed for the purpose, but when lightness is desirable aluminum may be employed.

The cylindrical portions 7' of the bearing box members are eccentrically placed with respect to the flanges 7. Openings substantially concentric with the flanges 7 are formed in the ends of the cylindrical portions 7'. In each portion 7' a cylindrical bearing sleeve 10 formed of suitable material is supported in line with these openings in a cylindrical support 11. Each support 11, which is preferably integral with the walls of the box member in which it is supported, is connected at its ends to the ends of the box proper. The lower portion of the support is connected to the bottom of the box proper by two substantially vertical webs 14. The upper portion of the cylindrical support forms part of the upper wall of the box.

Each bearing sleeve 10 is provided at its inner end with an integrally formed collar 15 which abuts against the inner end of the sleeve support 11. Each sleeve 10 is held in place by a screw 16 tapped through the upper portion of the sleeve support with its lower end entering an aperture 17 formed for the purpose in the sleeve 10. As shown there are two apertures 17 formed in each sleeve 10 at points diametrically opposed.

Two similar oil and waste containing pockets 18 are formed at opposite sides of each sleeve support 11 by the walls of the box proper and the sides of the support 11 and the webs 14. Openings 19 which may be substantially rectangular are formed in opposite sides of the support 11. Each bearing sleeve 10 has an aperture or opening 20 formed in one of its sides. The bearing sleeve 10 shown at the left hand end of Fig. 1 and in Fig. 2 is arranged so that its aperture 20 registers with the left hand aperture 19 as seen in Fig. 2. As thus arranged the bearing for the left hand end of the armature shaft 21 as seen in Fig. 1 is lubricated by oil and waste contained in the left hand pocket 18. With this arrangement it is assumed that the side thrust usually found in constructions of this character is such as to cause the armature shaft to be forced against the right hand side of the bearing sleeve shown in Fig. 2. When the side thrust is in the opposite direction the screw 16 is loosened sufficiently to move its lower end out of the aperture 17. The sleeve 10 is given a half turn after which the screw 16 is again screwed home, this time entering the second aperture 17. The half revolution of the sleeve 10 causes the aperture 20 to register with the aperture 19 in the support 11 at the right of the shaft 21 which is then lubricated from the right hand pocket 18.

A cover plate 23 is hinged to each box at 24 and normally closes an opening in the upper side of the bearing box through which the pockets 18 are filled with oil and waste. This cover plate also covers the heads of the screws 16. It will be observed that the heads of the screws 16 are located in depressions in the upper portion of the bearing sleeve support so that any oil which may creep along the threaded surfaces of the screws will not be carried to the outside of the boxes.

The space below the bearing sleeve 11 and between the vertical webs 14 forms a chamber 25 in each box in which waste oil from the bearing accumulates. A plug 26 is removably secured in an opening formed in the bottom of each of these chambers through which waste oil may be removed from time to time. In order to prevent the accumulation of an undue amount of oil in the chamber 25, a drain plug 27 is also tapped into the bottom of each chamber. The plugs 27 are hollow and are formed with openings 28 at their upper ends communicating with the bores of the plugs. When the level of oil in either chamber 25 rises to a predetermined height any excess of oil in the chamber will flow out through the opening 28 and the hollow in the corresponding plug 27. Downwardly inclined flanges or webs 29 are located in each chamber 25 extending between the webs 14 from opposite ends of the box nearly half the length of the box. These flanges allow of the accumulation of a large amount of oil in each chamber 25 while preventing the oil from moving out of the lower end of the chamber 25 when the motor is tilted out of its normal horizontal position.

As shown the armature shaft 21 is provided with a flange or collar 30 adjacent the inner end of each bearing sleeve 10 which serves to throw any oil which may leak out between the shaft 21 and the sleeves 10, at the inner ends of the latter, into channels or spaces 31 surrounding the flanges 30. A similar channel or space 32 is formed at the other end of each bearing box in which oil which leaks out between the shaft and sleeve at the outer end of the latter may be collected. The oil passing into the channels or spaces 31 and 32 in each box is carried to the waste oil chamber 25 by the flanges 29.

The apertures at the outer ends of the bearing boxes are threaded. A plug 34 is secured in the threaded aperture in the right hand end of the right hand bearing box as seen in Fig. 1. Rings 35 and packing 36 are secured in the threaded aperture in the left hand end of the left hand bearing box, thus forming a stuffing box to prevent the passage of oil along the shaft 21 which projects through this end of this bearing box. This stuffing box also prevents the entrance of dirt into the bearing from the exterior.

It will be observed that the only chance for dirt to enter the left hand bearing box as seen in Fig. 1, is through the stuffing box and underneath the cover plate 23. The only chance for dirt to enter the right hand bearing box as seen in Fig. 1, is under the cover plate 23. The only paths for oil to leak out of the pockets 18 are between the bearing sleeves 10 and the shaft 21 and between the bearing sleeves 10 and the corresponding supports 11. When the bearings are properly constructed it is found that the oil leakage out of the pockets 18 is very slight.

What I claim as new and desire to secure by Letters Patent of the United States, is,—

1. In combination, a shaft having a side thrust exerted upon it, a bearing box provided with a pair of accessible pockets containing lubricating material, a bearing sleeve having an aperture formed in one side and adapted to open into either of said pockets and means for securing the sleeve with the aperture opening into one of said pockets depending upon the direction of the side thrust, said means being accessible from the exterior of said box.

2. A bearing box formed with two accessible chambers containing lubricating material and provided with a bearing sleeve support located between said chambers, said support having apertures formed in opposite sides and communicating with said chambers, a bearing sleeve having one aperture formed in it and adapted to open into either of said chambers, a shaft having a side thrust exerted upon it journaled in said sleeve, and means for securing said sleeve in said support so that the aperture in the sleeve registers with one of the apertures in the support depending upon the direction of the side thrust, said means being accessible from the exterior of said box.

3. In a bearing-box provided with a pair of accessible pockets containing lubricating material, a shaft having a side thrust exerted upon it, a bearing-sleeve having an aperture formed in one side, and means for securing the sleeve with the aperture opening into either of said pockets dependent upon the direction of the side thrust, the aperture being arranged on the side of the bearing opposite to that which receives the thrust, said means being accessible from the exterior of said box.

4. In a bearing-box provided with a pair of pockets containing lubricating material, a shaft having a side thrust exerted upon it, a bearing-sleeve having an aperture formed in one side, and a screw accessible from the exterior of said box for securing the sleeve with the aperture opening into either of said pockets, dependent upon the direction of the side thrust.

5. In a bearing box provided with a pair of pockets containing lubricating material, a shaft having a side thrust exerted upon it, a bearing-sleeve having an aperture formed in one side, a screw for securing the sleeve with the aperture opening into either of said pockets, dependent upon the direction of the side thrust, said pockets having an opening through which the lubricating material is introduced, and a plate for covering said latter opening and the head of the screw.

6. A bearing-box formed with a pair of pockets containing lubricating material and provided with a bearing-sleeve support located between said pockets, said bearing-sleeve support being provided with two chambers separated by an inclined wall having an opening in its lowest portion, one of said chambers being arranged to receive waste oil from the bearing and deposit it into the other chamber through the said opening and said inclined wall serving to prevent the return of the waste oil when the box is tipped out of its normal position.

In witness whereof I have hereunto set my hand this 28th day of October, 1904.

EDDY R. WHITNEY.

Witnesses:
JOHN A. McMANUS, Jr.,
DUGALD McK. McKILLOP.